US012552169B2

(12) United States Patent
Ogawa et al.

(10) Patent No.: US 12,552,169 B2
(45) Date of Patent: Feb. 17, 2026

(54) LIQUID EJECTING APPARATUS

(71) Applicant: BROTHER KOGYO KABUSHIKI KAISHA, Nagoya (JP)

(72) Inventors: Mikio Ogawa, Nagoya (JP); Hiroyuki Tanaka, Inazawa (JP); Ryuji Kato, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 247 days.

(21) Appl. No.: 18/544,858

(22) Filed: Dec. 19, 2023

(65) Prior Publication Data

US 2024/0326441 A1 Oct. 3, 2024

(30) Foreign Application Priority Data

Mar. 31, 2023 (JP) ................................. 2023-057191

(51) Int. Cl.
*B41J 2/165* (2006.01)
*B41J 29/17* (2006.01)

(52) U.S. Cl.
CPC ........... *B41J 2/16538* (2013.01); *B41J 29/17* (2013.01); *B41J 2002/16573* (2013.01); *B41P 2235/21* (2013.01)

(58) Field of Classification Search
CPC .............................. B41J 2/16538; B41J 29/17
See application file for complete search history.

(56) References Cited

U.S. PATENT DOCUMENTS

2015/0035900 A1* 2/2015 Mano .................. B41J 2/16538 347/33

FOREIGN PATENT DOCUMENTS

| | | | | |
|---|---|---|---|---|
| JP | 2008-126576 | A | | 6/2008 |
| JP | 2010030212 | A | * | 2/2010 |
| JP | 2011-51125 | A | | 3/2011 |
| JP | 2015091638 | A | * | 5/2015 |

* cited by examiner

*Primary Examiner* — Sharon Polk
(74) *Attorney, Agent, or Firm* — Merchant & Gould P.C.

(57) ABSTRACT

There is provided a liquid ejecting apparatus including: a head having a nozzle surface in which a nozzle is opened; a wiper configured to move relative to the head in a state that the wiper is in contact with the nozzle surface; and a controller. The controller is configured to move the wiper relative to the head based on a moving velocity determined based on parameters including first parameter according to a receding contact angle of a liquid to be discharged from the nozzle and second parameter according to a viscosity of the liquid.

14 Claims, 12 Drawing Sheets

FIG. 7

80

| KIND INFORMATION | SIZE a [m] OF ONE MOLECULE | DIAMETER d [m] OF LIQUID DROPLET | VISCOSITY η [mPa·s] | EQUILIBRIUM CONTACT ANGLE $\theta_E$ [rad] | RECEDING CONTACT ANGLE $\theta_D$ [rad] | SURFACE TENSION γ [N/m] |
|---|---|---|---|---|---|---|
| INK A | $1 \times 10^{-10}$ | 0.00248 | 4.05 | 1.29 | 0.87 | 0.0300 |
| INK B | $1 \times 10^{-10}$ | 0.00248 | 5.20 | 1.05 | 0.79 | 0.0240 |
| INK C | $1 \times 10^{-10}$ | 0.00248 | 3.20 | 1.36 | 1.23 | 0.0300 |

FIG. 9

81

| COUNT VALUE U [h] | SIZE a [m] OF ONE MOLECULE | DIAMETER d [m] OF LIQUID DROPLET | VISCOSITY $\eta$ [mPa·s] | EQUILIBRIUM CONTACT ANGLE $\theta_E$ [rad] | RECEDING CONTACT ANGLE $\theta_D$ [rad] | SURFACE TENSION $\gamma$ [N/m] |
|---|---|---|---|---|---|---|
| 0 | $1 \times 10^{-10}$ | 0.00248 | 4.05 | 1.29 | 0.87 | 0.0300 |
| 10 | $1 \times 10^{-10}$ | 0.00226 | 6.44 | 1.27 | 0.79 | 0.0295 |
| 20 | $1 \times 10^{-10}$ | 0.00217 | 12.59 | 1.26 | 0.70 | 0.0290 |
| 30 | $1 \times 10^{-10}$ | 0.00203 | 22.92 | 1.24 | 0.61 | 0.0285 |
| 40 | $1 \times 10^{-10}$ | 0.00192 | 193.49 | 1.22 | 0.52 | 0.0280 |
| 50 | $1 \times 10^{-10}$ | 0.00183 | 598.54 | 1.20 | 0.44 | 0.0275 |

LIQUID EJECTING APPARATUS

REFERENCE TO RELATED APPLICATIONS

This application claims priority from Japanese Patent Application No. 2023-057191 filed on Mar. 31, 2023. The entire content of the priority application is incorporated herein by reference.

BACKGROUND ART

For example, in some ink-jet recording apparatuses, a wiping velocity is changed according to the viscosity of an ink so as to appropriately remove the ink from a surface, of a head, in which an ejection port is formed. Further, in some liquid jetting apparatuses, a moving velocity of a wiper is set in proportion to the surface tension of an ink intending to recover the meniscus in an ensured manner.

SUMMARY

However, even in a case that the moving velocity of the wiper with respect to the head is set in consideration of the viscosity and/or the surface tension of the liquid, there is such a fear that the liquid on a nozzle surface might not be satisfactorily wiped by the wiper. As an example, there is such a fear that the liquid on the nozzle surface might not be satisfactorily wiped by the wiper in a case that a condition different from the viscosity and/or the surface tension of the liquid affects the wiping by the wiper.

The present disclosure has been made in view of the above-described point; an object of the present disclosure is to provide a means for removing a liquid adhered to a nozzle surface of a head satisfactorily with a wiper.

(1) According to a first aspect of the present disclosure, there is provided a liquid ejecting apparatus including:

a head having a nozzle surface in which a nozzle is opened;

a wiper configured to move relative to the head in a state that the wiper is in contact with the nozzle surface; and a controller, wherein the controller is configured to move the wiper relative to the head based on a moving velocity determined based on parameters including first parameter according to a receding contact angle of a liquid to be discharged from the nozzle and second parameter according to a viscosity of the liquid.

According to the above-described configuration, a moving velocity of the wiper is determined based on the receding contact angle of the liquid and the viscosity of the liquid, and thus occurrence of unwiped liquid by the wiper is reduced.

(2) The liquid ejecting apparatus of the first aspect may further include a memory. In the first aspect, the memory may store the first parameter and the second parameter, and the controller may be configured to determine the moving velocity based on the parameters including the first parameter and the second parameter.

(3) In the first aspect, the first parameter may be indicated by $\gamma \tan \theta_D$, provided that "$\gamma$" is a surface tension of the liquid and "OD" is the receding contact angle of the liquid.

(4) In the first aspect, the controller may be configured to move the wiper relative to the head based on the moving velocity determined based on the parameters including third parameter according to an equilibrium contact angle of the liquid, the first parameter, and the second parameter.

According to the above-described configuration, the moving velocity of the wiper is determined further based on the equilibrium contact angle of the liquid, and thus occurrence of unwiped liquid by the wiper is further reduced.

(5) The liquid ejecting apparatus of the first aspect may further include a memory. In the first aspect, the memory may store the first parameter, the second parameter and the third parameter; and the controller may be configured to determine the moving velocity based on the parameters including the first parameter, the second parameter and the third parameter.

(6) In the first aspect, the third parameter may be indicated by ($\cos \theta_D - \cos \theta_E$), provided that "$\theta_D$" is the receding contact angle of the liquid and "$\theta_E$" is the equilibrium contact angle of the liquid.

(7) In the first aspect, the memory may store a table in which the receding contact angle of the liquid corresponding to a kind of the liquid is set as the first parameter; and the controller may be configured to obtain kind information indicating the kind of the liquid and to determine the receding contact angle of the liquid according to the obtained kind information and based on the table.

(8) In the first aspect, in the table, the receding contact angle of the liquid corresponding to an elapsed time elapsed since the wiper has been moved relative to the head may be set; and the controller may be configured to obtain the elapsed time elapsed since the wiper has been moved relative to the head and to determine the receding contact angle of the liquid in the first parameter, according to the obtained elapsed time.

The water content of the liquid is evaporated due to the elapse of time, and consequently the receding contact angle is changed. According to the above-described configuration, the receding contact angle is determined according to the elapsed time, and thus occurrence of unwiped liquid by the wiper is reduced.

(9) The liquid ejecting apparatus of the first aspect may further include a memory. In the first aspect, the memory may store a table in which the moving velocity corresponding to a kind of the liquid is set; and the controller may be configured to obtain kind information indicating the kind of the liquid and to determine the moving velocity according to the obtained kind information and based on the table.

(10) In the first aspect, the moving velocity corresponding to an elapsed time elapsed since the wiper has been moved relative to the head may be set in the table; and the controller may be configured to obtain the elapsed time elapsed since the wiper has been moved relative to the head and to determine the moving velocity according to the obtained elapsed time and based on the table.

(11) In the first aspect, a maximum value of the moving velocity may satisfy following expressions:

$$V\text{max} = \gamma \tan\theta_D(\cos\theta_D - \cos\theta_E)/3\eta L$$

$$L = \ln(d/a)$$

provided that, "Vmax" is the maximum value of the moving velocity of the wiper, "$\gamma$" is a surface tension of the liquid, "$\theta_D$" is the receding contact angle of the liquid, "$\theta_E$" is an equilibrium contact angle of the liquid, "$\eta$" is the viscosity of the liquid; "d" is a diameter of a droplet of the liquid, and "a" is a size of one molecule of the liquid.

(12) According to a second aspect of the present disclosure, there is provided a liquid ejecting apparatus including:

a head having a nozzle surface in which a nozzle is opened;

a wiper configured to move relative to the head in a state that the wiper is in contact with the nozzle surface; and a controller, wherein the controller is configured to move the wiper relative to the head based on a moving velocity determined based on parameters including first parameter according to a receding contact angle of a liquid to be discharged from the nozzle and second parameter according to a viscosity of the liquid; and a maximum value of the moving velocity satisfies the following expressions:

$$V\max = \gamma\tan\theta_D(\cos\theta_D - \cos\theta_E)/3\eta L$$

$$L = \ln(d/a)$$

provided that, "Vmax" is the maximum value of the moving velocity of the wiper, "γ" is a surface tension of the liquid, "$\theta_D$" is the receding contact angle of the liquid, "$\theta_E$" is an equilibrium contact angle of the liquid, "η" is the viscosity of the liquid, "d" is a diameter of a droplet of the liquid, and "a" is a size of one molecule of the liquid.

(13) The liquid ejecting apparatus of the second aspect may further include a memory. In the second aspect, the memory may store the first parameter and the second parameter; and the controller may be configured to determine the moving velocity based on the parameters including the first parameter and the second parameter.

(14) According to a third aspect of the present disclosure, there is provided a control method for a liquid ejecting apparatus, the liquid ejecting apparatus including:

a head having a nozzle surface in which a nozzle is opened;

a wiper configured to move relative to the head in a state that the wiper is in contact with the nozzle surface; and a controller, the method including moving the wiper relative to the head, by the controller, based on a moving velocity determined based on parameters including first parameter according to a receding contact angle of a liquid to be discharged from the nozzle and second parameter according to a viscosity of the liquid.

According to the present disclosure, a liquid adhered to a nozzle surface of a head is removed satisfactorily with a wiper.

BRIEF DESCRIPTION OF DRAWINGS

FIG. 7 is a view depicting a table 80 stored in a memory 140.

FIG. 9 is a view depicting a table 81 stored in a memory 140 of a printer 10.

FIG. 10 includes a graph of a case that a change of the receding contact angle $\theta_D$ is considered and a graph of a case that the change of the receding contact angle $\theta_D$ is not considered.

DESCRIPTION

Figure 1:
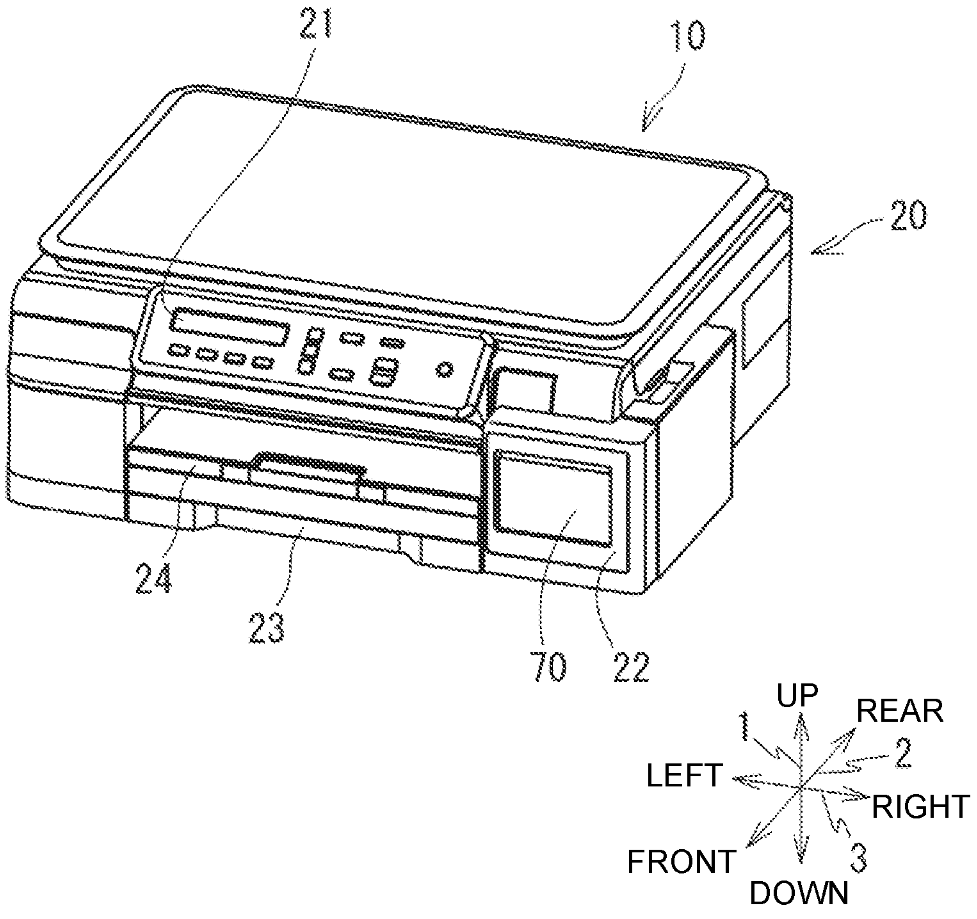
FIG. 1 is a perspective view of a printer 10.

In the following, a printer 10 (an example of "liquid ejecting apparatus") according to an embodiment of the present disclosure will be explained. Note that the embodiment described below is merely an example of the present disclosure; it is needless to say that the embodiment can be appropriately changed within a range in which the gist of the present disclosure is not changed.

In the embodiment, an up-down direction 1 is defined using a state in which the printer 10 is installed usably (a state of FIG. 1) as the reference; a front-rear direction 2 is defined assuming that a side to which a paper feed tray 23 is drawn out is a front side; and a left-right direction 3 is defined seeing the printer 10 from the front side.

<Outer Configuration of Printer 10>

As depicted in FIG. 1, the printer 10 is provided with a casing 20; and an operating part 21, a cover 22, a paper feed tray 23, a paper discharge tray 24, a controller 130 and a memory 140 which are held by the casing 20. The printer 10 is configured to record an image on a sheet 6 (see FIG. 2).

The sheet 6 may be a recording medium which is cut to a predetermined size, a recording medium drawn from a roll wound in a tube shape, or a recording medium of a fan-fold type.

The operating part 21 is provided with a display and a plurality of operating switches. The operating part 21 receives an operation from a user. The operating part 21 may be a touch panel.

As depicted in FIG. 1, the paper feed tray 23 is positioned at a lower part of the casing 20. The paper discharge tray 24 is positioned at the lower part of the casing 20, at a location above the paper feed tray 23. The cover 22 is positioned in a right part of a front surface of the casing 20. The cover 22 is rotatable with respect to the casing 20, at a lower end of the cover 22. In a case that the cover 22 is opened, a cartridge 70 configured to store an ink can be accessed.

In the present embodiment, the cartridge 70 is not limited to a cartridge which stores one color ink such as a black ink, and may be, for example, four cartridges 70 configured to store, respectively, four color inks which are black, yellow, cyan and magenta inks. An IC substrate (not depicted in the drawings) is mounted on the cartridge 70; kind information specifying the kind of the ink stored in the cartridge 70 is stored in the IC substrate.

<Print Engine 50>

Figure 2:
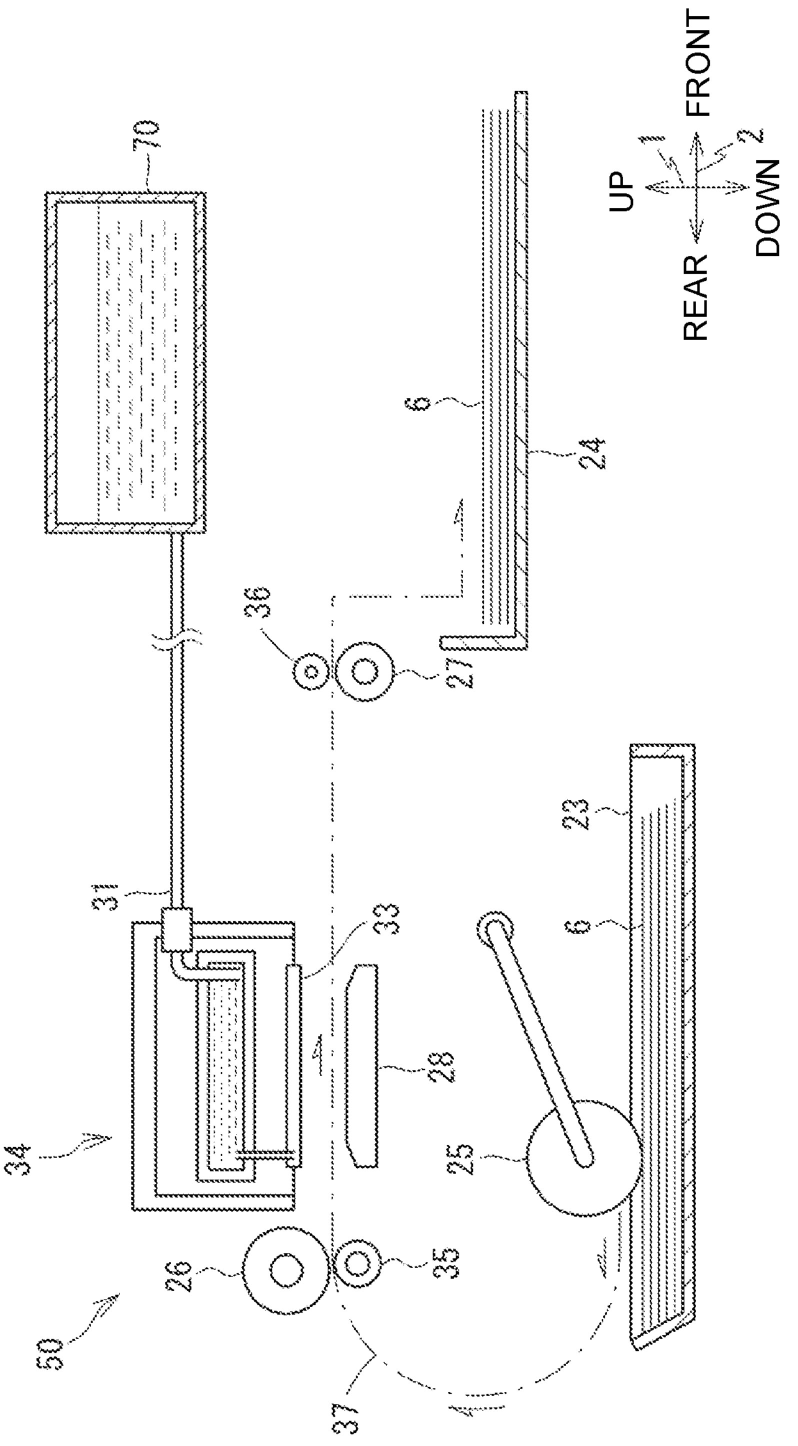
FIG. 2 is a schematic view depicting the internal configuration of the printer 10.

The casing 20 has a print engine 50 held in the casing 20. As depicted in FIG. 2, the print engine 50 is mainly provided with a feeding roller 25, a conveying roller 26, a discharging roller 27, a platen 28 and a printing head (an example of a "head") 34. The feeding roller 25 is held by a non-depicted frame provided in the casing 20 so that the feeding roller 25 is capable of making contact with the sheet 6 placed on the paper feed tray 23. The feeding roller 25 is rotated by a feeding motor 102 (see FIG. 4). The feeding roller 25 which is being rotated feeds the sheet 6 to a conveying path 37. The conveying path 37 is a space defined by a non-depicted guide member. In the depicted example, the conveying path 37 extends, while curving, from a rear end of the paper feed tray 23 up to a position above the paper feed tray 23, and then extends frontward.

The conveying roller 26 is located downstream of the paper feed tray 23, in a conveying direction (indicated by an arrow in FIG. 2) of the sheet 6. The conveying roller 26 constructs a roller pair together with a driven roller 35. The conveying roller 26 is rotated by a conveying motor 101 (see FIG. 4). The conveying roller 26 and the driven roller 35 which are being rotated convey the sheet 6 fed to the conveying path 37 by the feeding roller 25, while pinching the sheet 6 therebetween. The discharging roller 27 is located downstream of the conveying roller 26 in the conveying direction of the sheet 6. The discharging roller 27 constructs a roller pair together with a driven roller 36. The discharging roller 27 is rotated by the conveying motor 101 (see FIG. 4), like the conveying roller 26. The discharging roller 27 and the driven roller 36 which are being rotated convey the sheet 6, while pinching the sheet 6 therebetween, and discharge the sheet 6 to the paper discharge tray 24. The platen 28 is positioned between the conveying roller 26 and the discharging roller 27 in the front-rear direction 2, and downstream of the conveying roller 26 and upstream of the discharging roller 27, in the conveying direction of the sheet 6.

A rotary encoder 75 (see FIG. 4) configured to detect a rotation amount of the conveying roller 26 is provided on the conveying roller 26. The rotary encoder 75 is constructed of an encoder disc (not depicted in the drawings) which rotates together with the conveying roller 26 and an optical sensor (not depicted in the drawings). A pattern wherein a light transmittable part through which a light is transmittable and a non-light transmittable part through which the light is not transmittable are alternately arranged at an equal pitch therebetween in the circumferential direction is formed in the encoder disc. In a case that the encoder disc rotates, a pulse signal is generated every time the light transmittable part and the non-light transmittable part are detected by the optical sensor. The generated pulse signal is outputted to the controller 130 (see FIG. 4). The controller 130 calculates the rotation amount of the conveying roller 26 based on the pulse signal.

An upper surface of the platen 28 is a supporting surface for the sheet 6. Although not depicted in the respective drawings, an opening in which a suction pressure is generated is formed in the upper surface of the platen 28. By the suction pressure generated in the upper surface of the platen 28, the sheet 6 is capable of making a tight contact with the upper surface of the platen 28.

The printing head 34 is positioned between the conveying roller 26 and the discharging roller 27. The printing head 34 is positioned at a location above and facing the platen 28, with the conveying path 37 being intervened therebetween. The printing head 34 is a so-called serial head. The printing head 34 is supported by a carriage 40; the carriage 40 is supported to be movable by a guiderail (not depicted in the drawings) extending along the left-right direction 3. The carriage 40 is moved by a carriage driving motor 103 (see FIG. 4). Namely, the printing head 34 is movable along the left-right direction 3.

An encoder 38 (see FIG. 4) is arranged in the guide rail. The encoder 38 is provided with an encoder strip extending along the guide rail and an optical sensor provided on the carriage 40 at a location facing the encoder strip. A pattern wherein a light transmittable part through which a light is transmittable and a non-light transmittable part through which the light is not transmittable are alternately arranged at an equal pitch therebetween in the left-right direction 3 is formed in the encoder strip. The optical sensor detects the light transmittable part and the non-light transmittable part, thereby generating a pulse signal. The pulse signal is a signal according to the position in the left-right direction 3 of the carriage 40. The pulse signal is outputted to the controller 130.

The printing head 34 has, in the inside thereof, a channel in which the ink flows. The channel is communicated with the cartridge 70 via a tube 31. Namely, the ink stored in the cartridge 70 is supplied to the printing head 34 through the tube 31. The printing head 34 has a plurality of nozzles 33 which are opened toward the platen 28. The ink supplied to the printing head 34 via the channel is ejected, as ink droplets, selectively from the plurality of nozzles 33, by driving of a piezoelectric element 45 (see FIG. 4) while the printing head 34 is being moved. Note that the printing head 34 may be a line head, rather than the serial head. In a case that the printing head 34 is the line head, a wiper 72 (see FIG. 3, to be described later on) may move relative to the line head, thereby wiping a nozzle surface 33A.

<Cap 71 and Wiper 72>

Figure 3:
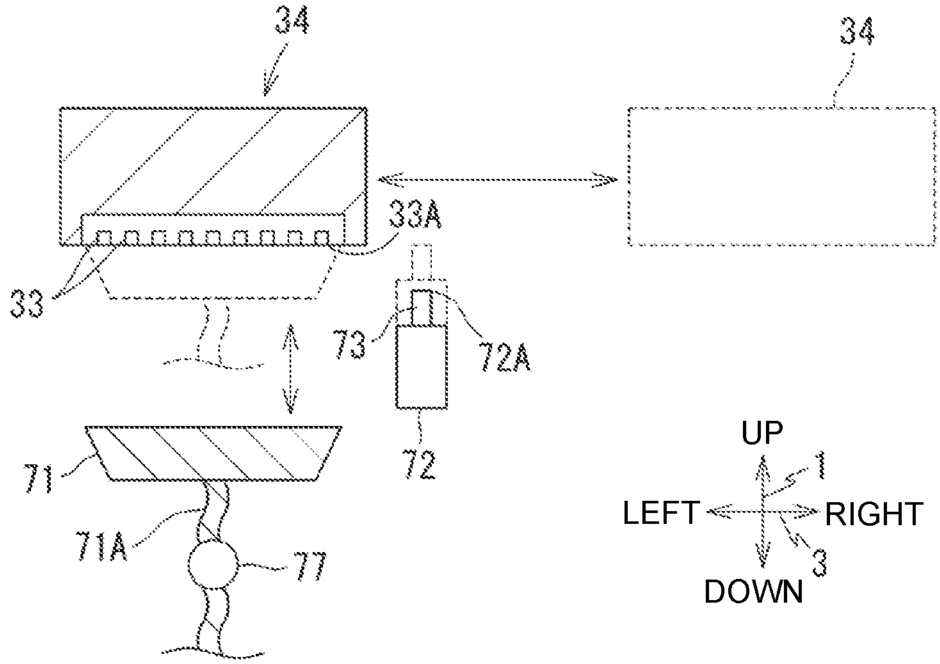
FIG. 3 is a schematic view depicting a printing head 34, a cap 71 and a wiper 72.

As depicted in FIG. 3, a cap 71 is constructed of an elastic member such as rubber, etc. The cap 71 is positioned below the printing head 34 in a maintenance position. The cap 71 has a shape of a cup which is opened upward. The cap 71 is movable in the up-down direction 1 by a cap driving motor 104. As depicted by broken lines in FIG. 3, the cap 71 makes tight contact with the nozzle surface 33A of the printing head 34 in the maintenance position so as to cover the openings of all the plurality of nozzles 33.

A waste ink tube 71A is connected to the cap 71. Specifically, a drain port is formed in a bottom part of the cap 71. An end of the waste ink tube 71A is connected to the drain port. A fluid is capable of flowing in the waste liquid tube 71A. The other end of the waste ink tube 71A is connected to a waste ink tank (not depicted in the drawings).

By a flushing processing and a purge processing, the ink inside the printing head 34 is forcibly discharged. The ink discharged from the printing head 34 by the pump 77 is received by the cap 71, passes through the waste ink tube 71A and is guided to the waste ink tank.

The wiper 72 is positioned in right of the cap 71, and is movable in the up-down direction 1 as depicted in broken lines in FIG. 3. The wiper 72 holds a forward end part 72A of a wiper blade 73 which is made of an elastic material such as rubber, etc., in a manner that the forward end part 72A faces upward. In a case that the printing head 34 moves in the left-right direction 3 in a state that the wiper 72 is located at an upper side, the forward end part 72A of the wiper blade 73 makes contact with the nozzle surface 33A and wipes the nozzle surface 33A. With this, an ink droplet(s) adhered to the nozzle surface 33A of the printing head 34 is wiped off by the wiper 72.

In the printing head 34, a maintenance processing which are the purge processing, a wiping processing and the flushing processing is performed. The flushing processing is a processing of discharging the ink toward a flushing foam (not depicted in the drawings). The purge processing is a processing of sucking the ink from the nozzles 33 by a pump 77 in a state that the nozzles 33 are covered by the cap 71. In the purge processing, in a case that the pump 77 is driven in a state that the waste ink tube 71A is in a non-communication state (that is, in a state that the waste ink tube 71A is closed at a position between the pump 77 and the waste ink tank), a negative pressure is generated in the inside of the cap 71, whereby any foreign matter is sucked out of the nozzles 33 together with the ink. The wiping processing is a processing of wiping the nozzle surface 33A of the printing head 34 by the wiper 72. In a case that the printing head 34 is positioned at the maintenance position, the printing head 34 is covered by the cap 71 (see FIG. 3) which is movable in the up-down direction 1, and the purge processing is performed. Further, in a case that the printing head 34 moves rightward from the maintenance position, whereby the printing head 34 makes contact with the wiper 72 and the wiping processing is performed. The flushing processing is performed in a case that the printing head 34 is located at a position above the flushing foam which is positioned in left of the maintenance position, the conveying path 37 being interposed between the flushing foam and the maintenance position.

<Maximum Moving Velocity Vmax of Wiper 72>

Figure 5A:
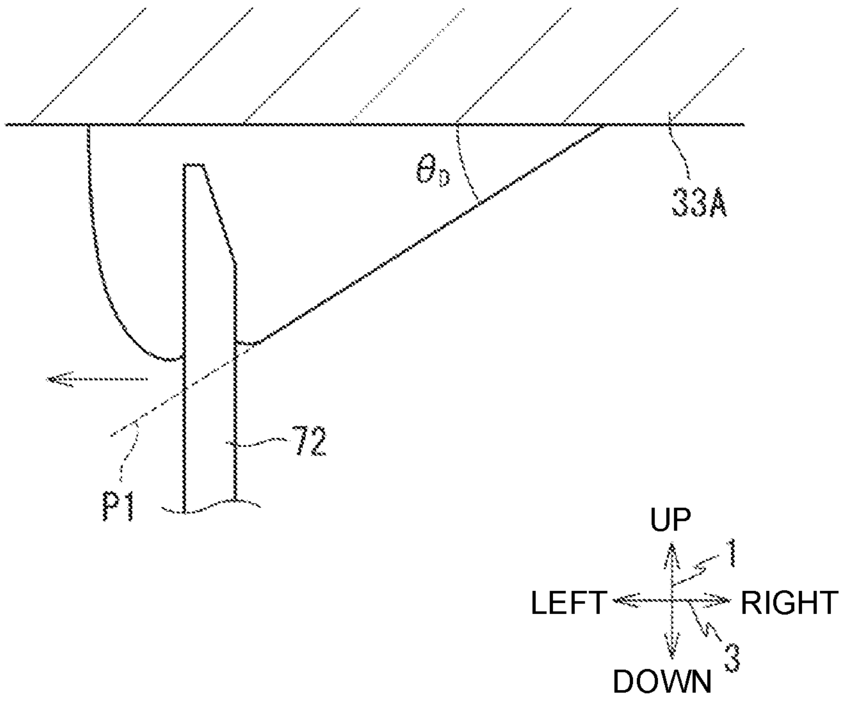
FIG. 5A is a schematic view depicting a receding contact angle $\theta_D$.
Figure 5B:
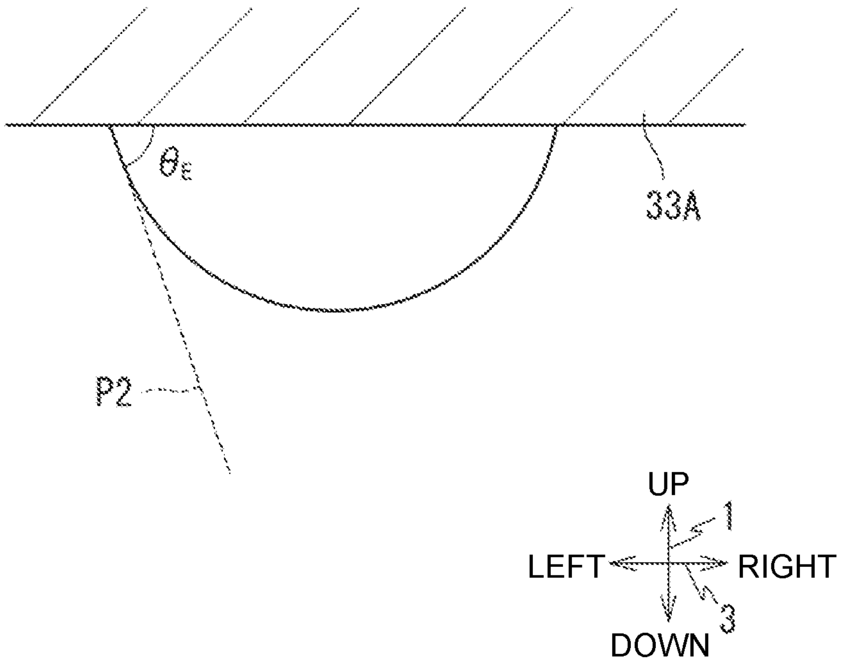
FIG. 5B is a schematic view depicting an equilibrium contact angle $\theta_E$.

In the following, an explanation will be given about a maximum moving velocity Vmax, of the wiper 72, which is a maximum value of a moving velocity V in a case that the nozzle surface 33A is wiped by the wiper 72. Wiping by the wiper 72 is performed for a purpose of wiping off the ink adhered to the nozzle surface 33A in a case that the flushing processing and/or the purge processing have (has) been performed. In this situation, by driving the wiper 72 at a velocity which is not more than the maximum moving velocity Vmax, the ink adhered to the nozzle surface 33A is wiped off in a satisfactorily manner. Here, provided that: a surface tension of the ink is $\gamma$ [N/m]; an angle defined by the nozzle surface 33A and a liquid surface (a virtual plane P1 formed in a boundary between a liquid phase and a gas phase) which is formed in the right side of an ink droplet in a case that the wiper 72 wipes the ink on the nozzle surface 33A (that is, in a case that the wiper 72 moves leftward with respect to the nozzle surface 33A, as indicated by an arrow) is a receding contact angle $\theta_D$ [rad], as depicted in FIG. 5A; an angle defined by the nozzle surface 33A and a liquid surface (a virtual plane P2 formed in a boundary between the liquid phase and the gas phase) in a case that the ink droplet stands still on the nozzle surface 33A is an equilibrium contact angle (an example of "third parameter") $\theta_E$ [rad], as depicted in FIG. 5B; the viscosity of the ink (an example of "second parameter") is n [mPa·s]; the diameter of the ink droplet to be discharged from the nozzle 33 is d [m], and a size of one molecule of the ink is "a" [m], the maximum moving velocity Vmax [m/s] satisfies the following expressions (1) and (2);

$$V\max = \gamma\tan\theta_D(\cos\theta_D - \cos\theta_E)/3\eta L \quad (1)$$

$$L = \ln(d/a) \quad (2)$$

In the above-described expression (1), the maximum moving velocity Vmax is proportional to $\gamma$ tan $\theta_D$ (an example of "first parameter") that is the tangent at the receding contact angle $\theta_D$ of the surface tension $\gamma$ of the ink. Further, the maximum moving velocity Vmax is proportional to a difference cos $\theta_D$–cos $\theta_E$ (an example of the "third parameter") that is the difference between the cosine of the receding contact angle $\theta_D$ of the ink and the cosign of the equilibrium contact angle $\theta_E$ of the ink. That is, greater the difference between the receding contact angle $\theta_D$ depicted in FIG. 5A and the equilibrium contact angle $\theta_E$ depicted in FIG. 5B is, greater the maximum moving velocity Vmax is. In a case that the maximum moving velocity Vmax, of the wiper 72, with respect to the nozzle surface 33A is determined, the receding contact angle $\theta_D$ and the equilibrium contact angle $\theta_E$ are considered in the calculation, unlike in the conventional technique. Thus, a value with which occurrence of unwiped ink is reduced is determined more correctly. In the printer 10, the wiper 72 is moved relative to the nozzle surface 33A at the moving velocity V which is not more than the determined maximum moving velocity Vmax. For example, in the printer 10, the wiper 72 is caused to wipe the nozzle surface 33A at the moving velocity V which is 90% of the maximum moving velocity Vmax. Note that the moving velocity V of the wiper 72 with respect to the nozzle surface 33A is made 90% of the maximum moving velocity Vmax in view of safety.

Figure 6A:
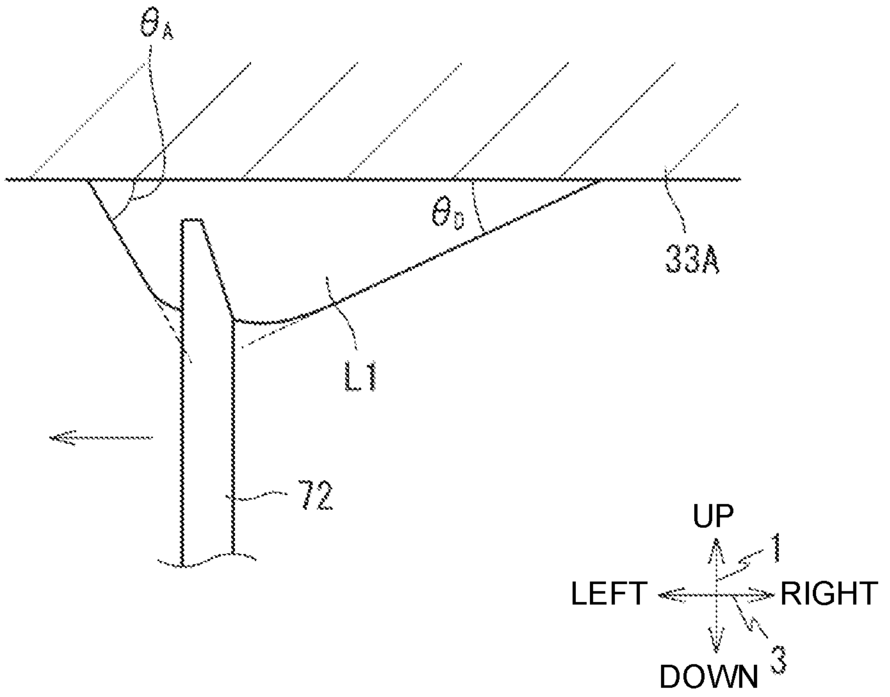
FIGS. 6A and 6B are each a view schematically depicting a behavior of an ink in cases which are different in a moving velocity V.
Figure 6B:
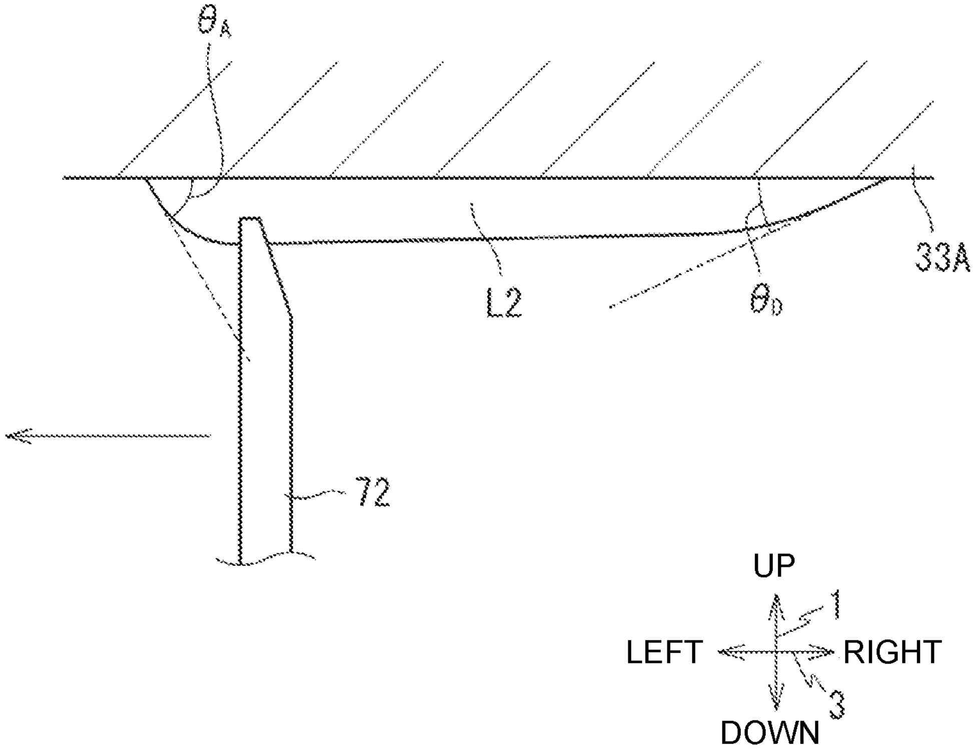

FIGS. 6A and 6B depict an example of a testing device wherein an ink droplet is wiped off by the wiper 72 in a state that the ink droplet adheres to the nozzle surface 33A. FIGS. 6A and 6B depict behavior of the ink droplet in a case that the wiper 72 is moved relative to the nozzle surface 33A leftward as indicate by an arrow. The moving velocity V of the wiper 72 relative to the nozzle surface 33A in FIG. 6A is slower than the moving velocity V of the wiper 72 relative to the nozzle surface 33A in FIG. 6B. The ink used in FIG. 6A and the ink used in FIG. 6B are same as each other, and the receding contact angle θD in FIG. 6A and the receding contact angle $\theta_D$ in FIG. 6B are same as each other. Further, as depicted in FIGS. 6A and 6B, an advancing contact angle $\theta_A$ which is an angle defined by the nozzle surface 33A and a liquid surface (a virtual plane P3 formed in the boundary between the liquid phase and the gas phase) which is formed in the left side of the ink droplet in the case that the wiper 72 wipes the ink on the nozzle surface 33A is also same as each other between FIGS. 6A and 6B. A volume of an ink droplet L1 in FIG. 6A and a volume of an ink droplet L2 in FIG. 6B are same as each other.

Since the ink droplet L2 of FIG. 6B is wiped off by the wiper 72 at a velocity which is faster than a velocity at which the ink droplet L1 of FIG. 6A is wiped off by the wiper 72, the ink droplet L2 spreads to be long in the left-right direction 3. In this situation, greater the difference between the equilibrium contact angle $\theta_E$ and the receding contact angle $\theta_D$ is, greater a force to return to the equilibrium contact angle $\theta_E$ is at a right side portion of the ink droplet L2. Thus, the right side portion of the ink droplet L2 is pulled rightward, and in a case that moving velocity V exceeds the maximum moving velocity Vmax, the right side portion of the ink droplet L2 is unable to follow the wiper 72. The unwiped ink is occurred in such a manner, and thus, as the moving velocity V becomes faster, the liquid is more likely to be left unwiped.

<Composition of Ink>

In the following, the details of the ink will be explained. The ink contains resin fine particles, a colorant, an organic solvent, a surfactant and water. The ink is a water-based ink.

Although the ink has a wettability with respect to a hydrophobic recording medium such as coated paper, plastic, film, an OHP sheet, etc., the present disclosure is not limited to this. For example, the ink may be an ink suitable for recording of an image on a recording medium, which is different from the hydrophobic recording medium, such as, for example, plain paper, glossy paper, mat paper, etc. The term "coated paper" means, for example, a paper obtained by applying a coating agent on a plain paper having a pulp as a major component, such as high quality printing paper, medium quality printing paper, etc., for a purpose of improving the smoothness, whiteness, glossiness, etc. Examples of the coated pattern are high quality coated paper, medium quality coated paper, etc.

As the resin fine particles, it is acceptable to use, for example, resin fine particles including methacrylic acid and/or acrylic acid as a monomer, and to use, for example, a commercially available product. It is acceptable that the resin fine particles further include, as the monomer, styrene, vinyl chloride, etc. The resin fine particles may be, for example, resin fine particles included in an emulsion. The emulsion is composed, for example, of resin fine particles and a dispersion medium (for example, water, etc.). The resin fine particles are not dissolved in the dispersion medium. The resin fine particles are dispersed in the dispersion medium with a particle diameter of a specific range. Examples of the material of the resin fine particles include, a resin based on acrylic acid, a resin based on maleate ester, a resin based on vinyl acetate, a resin based on carbonate, a resin based on polycarbonate, a resin based on styrene, a resin based on ethylene, a resin based on polyethylene, a resin based on propylene, a resin based on polypropylene, a resin based on urethane, a resin based on polyurethane, a resin based on polyester, and a resin of copolymer of the above-described resins, etc. The resin fine particles may be fine particles of an acrylic resin.

As the resin fine particles, for example, a resin having a glass-transition temperature (Tg) in a range of not less than 0° C. to not more than 200° C. is used. The glass transition temperature (Tg) may be in a range of not less than 20° C. to not more than 180° C., and may be not less than 30° C. to not more than 150° C.

As the emulsion, it is acceptable to use, for example, a commercially available product. The commercially available product is exemplified by "SUPERFLEX 870" (Tg: 71° C.), "SUPERFLEX 150" (Tg: 40° C.) manufactured by DKS CO., LTD ("SUPERFLEX" is a registered trade mark in Japan of DKS CO., LTD (DAI-ICHI KOGYO SEIYAKU CO., LTD); "Mowinyl 6760" (Tg: −28° C.) and "Mowinyl DM774" (Tg: 33° C.) manufactured by Japan Coating Resin Corporation. ("MOWINYL" is a registered trade mark in Japan of Japan Coating Resin Corporation.); "Polysol AP-3270N" (Tg: 27° C.) manufactured by Resonac Holding Corporation ("POLYSOL" is a registered trademark in Japan of Resonac Holdings Corporation); "HILOS-X KE-1062" (Tg: 112° C.), and "HILOS-X QE-1042" (Tg: 69° C.) manufactured by SEIKO PMC CORPORATION; etc.

The average particle diameter of the resin fine particles is, for example, in a range of not less than 30 nm to not more than 200 nm. The average particle diameter can be measured by, for example, using a dynamic light scattering particle diameter distribution measuring apparatus "LB-550" manufactured by HORIBA, Ltd., as an arithmetic average diameter.

A content amount (R) of the resin fine particles in the entire amount of the ink may be, for example, in a range of not less than 0.1 wt % to not more than 30 wt %, may be in a range of not less than 0.5 wt % to not more than 20 wt %, and may be in a range of not less than 1.0 wt % to not more than 15.0 wt %. It is acceptable to use one kind of the resin fine particles singly, or to use not less than two kinds of the resin fine particles in combination.

The colorant is, for example, a pigment which is dispersible in water by, for example, a resin for dispersing pigment (resin dispersant). The colorant is exemplified by carbon black, an inorganic pigment, an organic pigment, etc. The carbon black is exemplified by furnace black, lamp black, acetylene black, channel black, etc. The inorganic pigment is exemplified by titanium oxide, inorganic pigments based on iron oxide, inorganic pigments based on carbon black, etc. The organic pigment is exemplified by azo-pigments such as azo lake, insoluble azo-pigment, condensed azo-pigment, chelate azo-pigment, etc.; polycyclic pigments such as phthalocyanine pigment, perylene and perinone pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigment; nitroso pigment; aniline black daylight fluorescent pigment; and the like.

A solid content amount of the colorant (colorant solid component amount) in the entire amount of the ink is not particularly limited, and may be appropriately determined according to, for example, a desired optical density or chromaticness, etc. The colorant solid component amount is, for example, in a range of not less than 0.1 wt % to not more than 20.0 wt %, and may be in a range of not less than 1.0 wt % to not more than 15.0 wt %. The colorant solid component amount is the weight only of the pigment, and does not include the weight of the resin fine particles. One kind of the colorant may be used singly, or two or more kinds of the colorant may be used in combination.

The organic solvent is not particularly limited, and any organic solvent is usable. The organic solvent is exemplified by: propylene glycol, ethylene glycol, 1,2-butanedioal, propylene glycol monobutyl ether, dipropylene glycol monopropyl ether, triethylene glycol monobutyl ether, 1,2-hexianediol, 1,6-hexianediaol, etc.; and glycol ether having a propylene oxide group may be used. Examples of other organic solvent include, for example, alkylalcohols having a carbon number of 1 to 4 such as: methyl alcohol, ethyl alcohol, n-propyl alcohol, isopropyl alcohol, n-butyl alcohol, sec-butyl alcohol, tert-butyl alcohol, etc.; alkylene glycols in each of which an alkylene group includes 2 to 6 carbon atoms such as: ethylene glycol, propylene glycol, butylene glycol, triethylene glycol, 1,2,6-hexanetriol, thiodiglycol, hexylene glycol, diethylene glycol, etc.; lower alkyl ethers of alkylene glycols such as: glycerol, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetra propylene glycol monomethyl (or ethyl) ether; N-methyl-2-pyrrolidone; 2-pyrrolidone; 1,3-dimethyl-2-imidazolidinone; etc.

Regarding a content amount of the organic solvent in the entire amount of the ink, an organic solvent which exists in isolated liquid state (that is, as a single substance and as a liquid) at 25° C. may be not more than 50 wt %, and may be not more than 40 wt % with respect to the entire amount of the ink.

The water is preferably ion-exchange water or purified water. A content amount of the water with respect to the entire amount of the ink may be, for example, within a range of not less than 15 wt % to not more than 95 wt %, and may be within a range of not less than 25 wt % to not more than 85 wt %. The content amount of the water may be, for example, a remainder of the total from which other components are removed.

The ink may further include a conventionally known additive, as necessary. The additive is exemplified by surfactants, pH-adjusting agents, viscosity-adjusting agents, surface tension-adjusting agents, antiseptics, fungicides, levelling agents, antifoaming agents, light stabilizing agents, antioxidants, drying preventive agents for nozzle, polymer components such as emulsion, dye, etc. The surfactants may further include cationic surfactants, anionic surfactants or nonionic surfactants. The surfactants may be commercially available products. The commercially available products are exemplified by "OLFINE E1010", "OLFINE E1006", and "OLFINE E1004" ("OLFINE" is a registered trade mark of Nissin Chemical Industry Co., Ltd.), "SILFACE SAG503A", "SILFACE SAG002" etc. ("SILFACE" is a registered trademark of Nissin Chemical Industry Co., Ltd.) manufactured by Nissin Chemical Industry Co., Ltd. The content amount of the surfactant in the entire amount of the ink is, for example, not more than 5 wt %, not more than 3 wt %, and in a range of 0.1 wt % to 2 wt %. The viscosity-adjusting agents are exemplified by polyvinyl alcohol, cellulose, water-soluble resin, etc.

The ink can be prepared, for example, by uniformly mixing the resin fine particles, the colorant, the organic solvent, the water, and an optionally other additive(s) as necessary, by a conventionally known method, and then removing any non-dissolved matter, with a filter, etc.

<Controller 130 and Memory 140>

Figure 4:
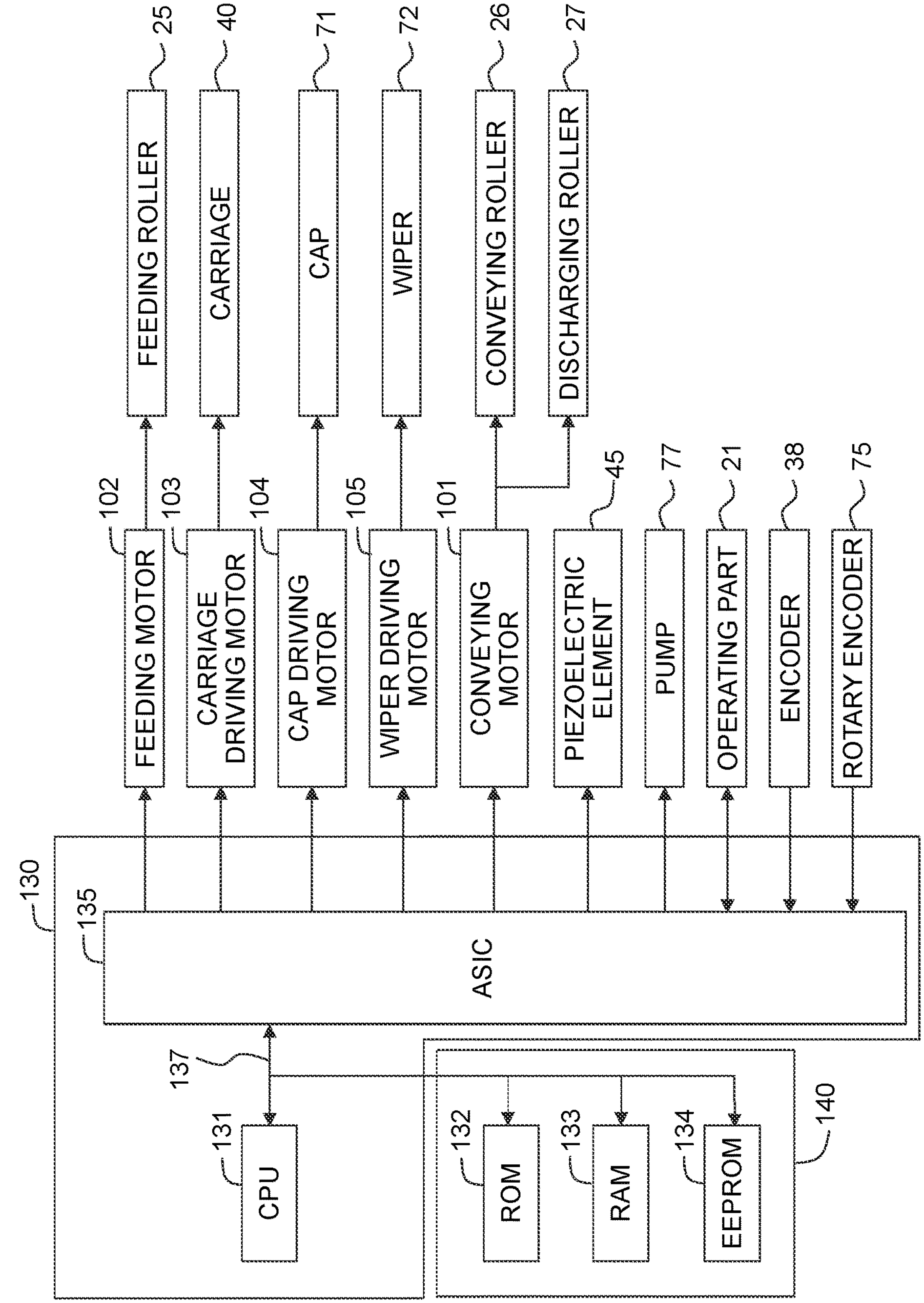
FIG. 4 is a functional block diagram of the printer 10.

In the following, the controller 130 and the memory 140 will be explained, with reference to FIG. 4. The controller 130 is configured to control the entire operation of the printer 10. The controller 130 is provided with a CPU 131 and an ASIC 135. The memory 140 is provided with a ROM 132, a RAM 133 and an EEPROM 134. The CPU 131, the ASIC 135, the ROM 132, the RAM 133 and the EEPROM 134 are connected with one another by an internal bus 137.

The ROM 132 stores a program(s), etc., with which the CPU 131 controls a variety of kinds of operations. The RAM 133 is used as a memory area configured to temporarily store data, signal, etc., to be used by the CPU 131 for executing the program, or is used as a work space for data processing. The EEPROM 134 stores a setting, a flag, etc., which is to be held even after the power source is switched off. As depicted in FIG. 7, the EEPROM 134 stores a table 80 storing respective values of the size "a" of one molecule of the ink; the diameter d of the ink droplet; the viscosity $\eta$ of the ink, the equilibrium contact angle $\theta_E$, the receding contact angle $\theta_D$ and the surface tension $\gamma$ of the ink, the values corresponding to a plurality of pieces of the kind information. The table 80 storing respective values of the size "a" of one molecule of the ink; the diameter d of the ink droplet; the viscosity $\eta$ of the ink, the equilibrium contact angle $\theta_E$, the receding contact angle $\theta_D$ and the surface tension $\gamma$ of the ink corresponding to the kind information may be stored in the ROM 132.

In the kind information, for example, three kinds of inks which are an ink A, an ink B and an ink C are stored; in the ink A, the size "a" of one molecule of the ink is $1\times10^{-10}$ [m], the diameter d of the ink droplet is 0.00248 [m], the viscosity $\eta$ is 4.05 [mPa·s], the equilibrium contact angle $\theta_E$ is 1.29 [rad], the receding contact angle $\theta_D$ is 0.87 [rad] and the surface tension $\gamma$ is 0.0300 [N/m].

In the ink B, the size "a" of one molecule of the ink is $1\times10^{-10}$ [m], the diameter d of the ink droplet is 0.00248 [m], the viscosity $\eta$ is 5.20 [mPa·s], the equilibrium contact angle $\theta_E$ is 1.05 [rad], the receding contact angle $\theta_D$ is 0.79 [rad] and the surface tension $\gamma$ is 0.0240 [N/m].

In the ink C, the size "a" of one of molecule of the ink is $1\times10^{-10}$ [m], the diameter d of the ink droplet is 0.00248 [m], the viscosity $\eta$ is 3.20 [mPa·s], the equilibrium contact angle $\theta_E$ is 1.36 [rad], the receding contact angle $\theta_D$ is 1.23 [rad] and the surface tension $\gamma$ is 0.0300 [N/m].

The conveying motor 101, the feeding motor 102, the carriage driving motor 103, the cap driving motor 104 and the wiper driving motor 105 are connected to the ASIC 135. Driving circuits each of which is configured to control one of the motors 101 to 105 are incorporated in the ASIC 135. The CPU 131 outputs driving signals each of which is for rotating one of the respective motors 101 to 105 to one of the driving circuits corresponding, respectively, to the motors 101 to 105. Each of the driving circuits is configured to output a driving current, corresponding to one of the driving signals obtained from the CPU 131, to one of the motors 101 to 105 corresponding thereto. With this, each of the motors 101 to 105 corresponding to one of the driving circuits is rotated. Namely, the controller 130 controls the feeding motor 102 so as to convey the sheet 6 to the conveying path 37. Further, the controller 130 controls the conveying motor 101 so as to drive the conveying roller 26 and the discharging roller 27 to thereby convey the sheet 6. Further, the controller 130 controls the carriage driving motor 103 so as to move the carriage 40. Furthermore, the controller 130 controls the cap driving motor 104 so as to move the cap 71 in the up-down direction 1.

Further, the optical sensor of the rotary encoder 75 is connected to the ASIC 135. The controller 130 calculates the rotation amount of the conveying motor 101 based on an electric signal received from the optical sensor of the rotary encoder 75. Furthermore, the encoder 38 is connected to the ASIC 135. The controller 130 recognizes the position of the carriage 40 and/or as to whether or not the carriage 40 is moved, based on the pulse signal received from the encoder 38.

Moreover, the piezoelectric element 45 is connected to the ASIC 135. The piezoelectric element 45 is operated by the electric power supplied by the controller 130 via a non-depicted drive circuit. The controller 130 controls the supply of the electric power to the piezoelectric element 45 so as to eject the ink droplets selectively from plurality of nozzles 33.

Further, the operating part 21 is connected to the ASIC 135. The ASIC 135 receives, from the operating part 21, a signal indicating that a button is pressed. The ASIC 135 outputs, with respect to the operating part 21, display data indicating a content which is to be displayed on the display. Other than those described above, the pump 77 is connected to the ASIC 135.

In a case that the controller 130 records an image on the sheet 6, the controller 130 alternately performs a conveying processing and a printing processing. The conveying processing is a processing of conveying the sheet 6 by a predetermined line feed amount by driving the conveying roller 26 and the discharging roller 27. The controller 130 executes the conveying processing by controlling the conveying motor 101. The printing processing is a processing of controlling the supply of the electric power to the piezoelectric element 45 so as to cause the printing head 34 to eject the ink droplets from the nozzles 33, while moving the carriage 40 along the left-right direction 3.

The controller 130 stops the sheet 6 for a predetermined period of time between the conveying processing performed this time and the conveying processing to be performed the next time. Further, while the sheet 6 is stopped, the controller 130 executes the printing processing. Namely, in the printing processing, the controller 130 executes one pass of causing the nozzles 33 to discharge the ink droplets, while moving the carriage 40 rightward or leftwards. With this, recording of an image corresponding to one pass is executed with respect to the sheet 6. By executing the conveying processing and the printing processing alternately and repeatedly, the controller 130 is capable of recording an image on an entire area, of the sheet 6, in which the image is recordable. Namely, the controller 130 records the image on one piece of the sheet 6 by performing a plurality of times of pass.

Note that the controller 130 is not limited to the above-described configuration; the controller 130 may be configured such that only the CPU 131 performs the various kinds of processing or that only the ASIC 135 performs the various kinds of processing, or that the CPU 131 and the ASIC 135 perform the various kinds of processing in a cooperative manner. The controller 130 may be configured such that one CPU 131 singly performs the processing, or that a plurality of pieces of the CPU 131 performs the processing in a sharing manner. The controller 130 may be configured such that one ASIC 135 singly performs the processing, or that a plurality of pieces of the ASIC 135 performs the processing in a sharing manner.

<Operation of Wiper 72>

In the printer 10, the wiping processing is performed so as to remove the ink droplet(s) adhered to the nozzle surface 33A. The wiping processing is performed as one of operations in the maintenance processing; the maintenance processing is performed in a case that the power source of the printer 10 is turned on, and is further performed also in a case that a time previously set has elapsed in a state that the power source of the printer 10 is turned on. In the following, the maintenance processing will be explained with reference to FIGS. 8A, 8B and 8C. Before the power sources of the printer 10 is turned on, the cap 71 is located at the upper side and covers the nozzle surface 33A. The moving velocity V of the printing head 34 with respect to the wiper 72 is explained regarding a case that the maintenance processing is performed at a low velocity mode. Note that the maintenance processing may be performed at a timing different from the above-described timing; for example, the maintenance processing may be performed in a case that the cartridge is replaced, or in a case that the image recording has been performed on the sheet(s) 6 of the number of sheets previously set. Further, the maintenance processing may be performed based on an input by the user from the operating part 21.

Figure 8A:
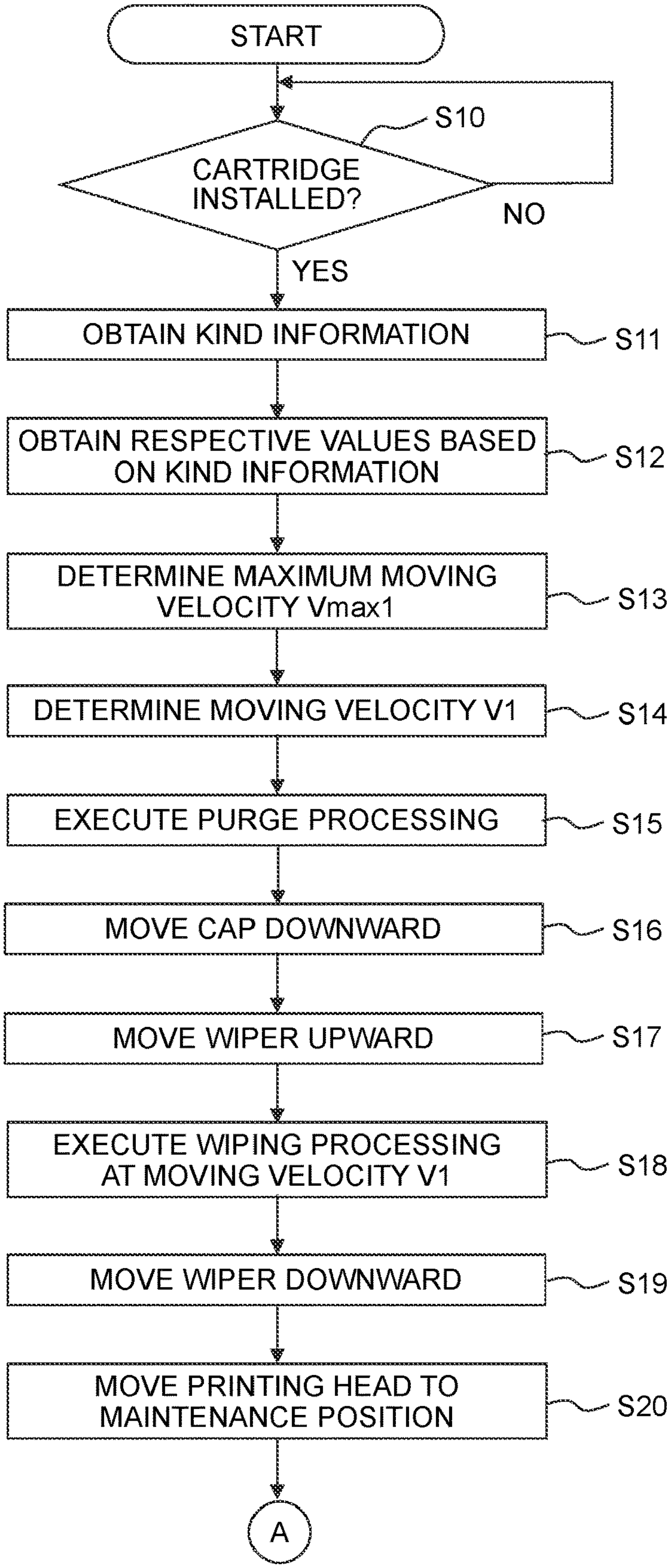
FIGS. 8A, 8B, and 8C are flow charts depicting an operation of a wiper 72.

As depicted in FIG. 8A, the controller 130 firstly determines as to whether or not the cartridge 70 is installed in the printer 10 in a case that the power source of the printer 10 is turned on (step S10). Next, in a case that the controller 130 determines that the cartridge 70 is installed in the printer 10 (step S10: YES), the controller 130 obtains the kind information of the ink A from the IC substrate (step S11). In a case that the controller 130 determines that the cartridge 70 is not installed in the printer 10 (step S10: NO), the controller 130 continues the determination until the cartridge 70 is installed in the printer 10 (step S10).

Among the plurality of pieces of the kind information stored in the table 80 (see FIG. 7), the controller 130 obtains the value of the size "a" of one molecule, the diameter d of the ink droplet, the viscosity $\eta$ of the ink, the equilibrium contact angle $\theta_E$, the receding contact angle $\theta_D$ and the surface tension $\gamma$ of the ink, of the ink A (step S12). The controller 130 determines a maximum moving velocity Vmax1 based on the obtained values (step S13). The controller 130 determines a moving velocity V1 of the printing head 34 with respect to the wiper 72 based on the maximum moving velocity Vmax1 (step S14). Specifically, the controller 130 determines the moving velocity V1 to be a velocity which is 90% of the maximum moving velocity Vmax1.

The controller 130 drives the pump 77 (step S15) and executes the purge processing. After the purge processing, the controller 130 drives the cap driving motor 104 (step S16) so as to move the cap 71 downward and separate the cap 71 away from the nozzle surface 33A.

The controller 130 drives the wiper driving motor 105 (step S17) so as to move the wiper 72 upward. The controller 130 drives the carriage driving motor 103 (step S18) so as to move the printing head 34, located at the maintenance position, rightward at the moving velocity V1. With this, the wiping processing is performed. In the wiping processing, the wiper 72 makes contact with the nozzle surface 33A while the printing head 34 is moved rightward, thereby wiping off the ink adhered to the nozzle surface 33A. The moving velocity V1 in this situation is a relative velocity in the left-right direction 3 of the wiper 72 relative to the nozzle surface 33A. After the controller 130 drives the carriage driving motor 103 so as to move the printing head 34 rightward, the controller 130 drives the wiper driving motor 105 (step S19) so as to move the wiper 72 positioned at the upper side downward. The controller 130 drives the carriage driving motor 103 (step S20) so as to move the printing head 34 leftward and up to the maintenance position.

Figure 8B:
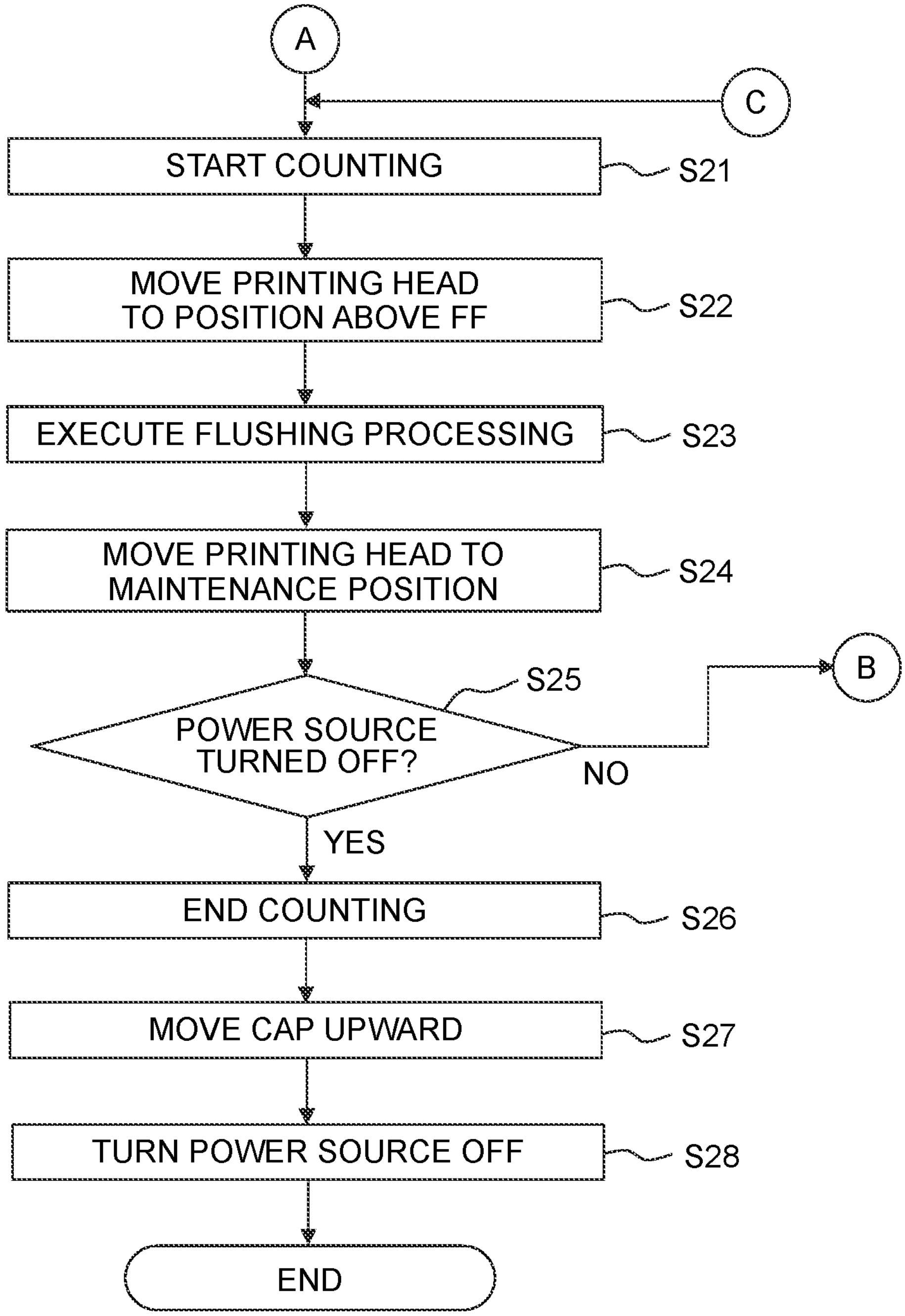
Figure 8C:
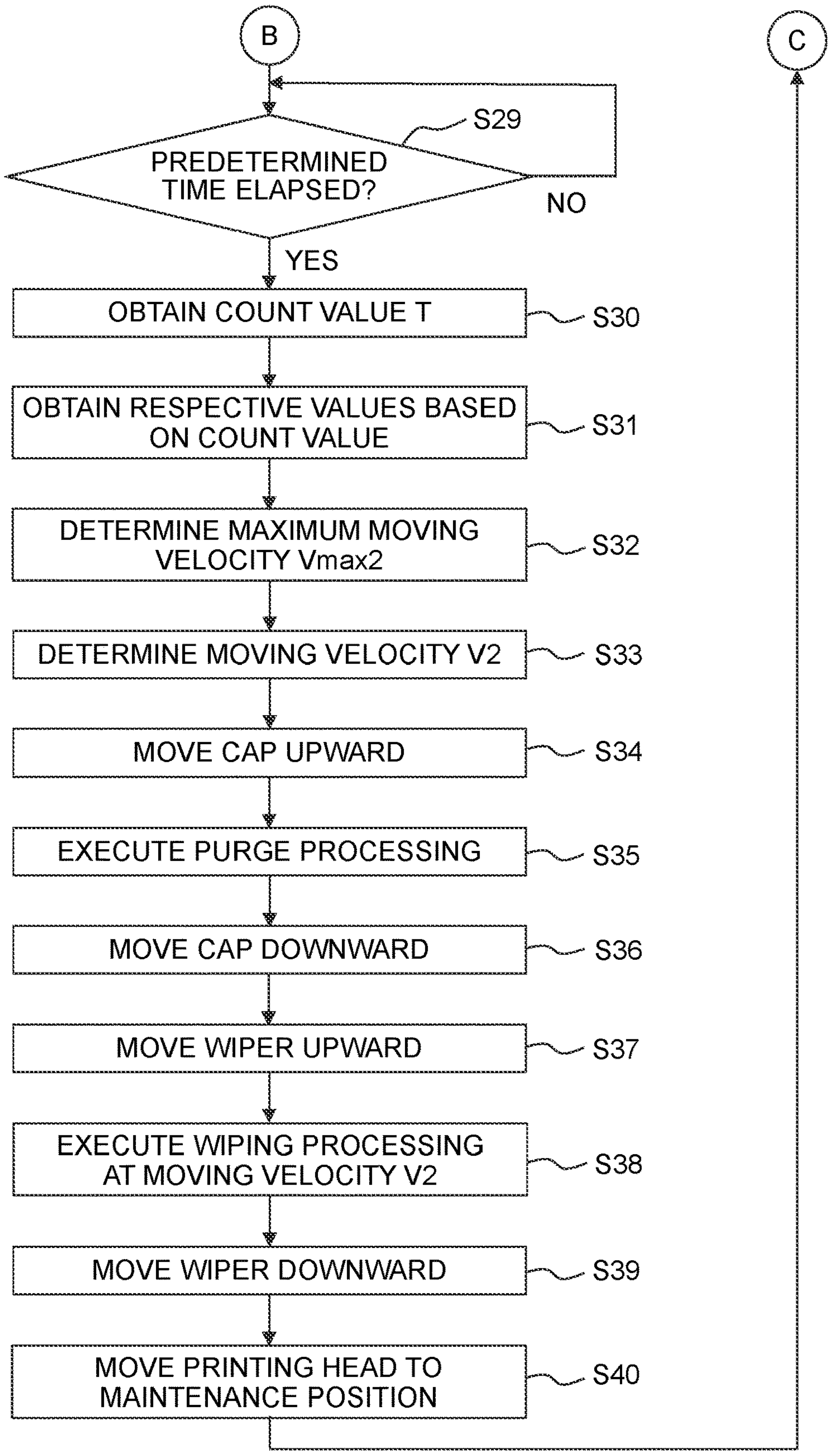

As depicted in FIG. 8B, immediately after the nozzle surface 33A has been wiped by the wiper 72 at the moving velocity V1, the controller 130 starts counting (step S21). The controller 130 drives the carriage driving motor 103 (step S22) so as to move the printing head 34 from the maintenance position to the position above the flushing foam (also referred to as "FF" in FIG. 8B). The controller 130 drives the piezoelectric element 45 (step S23) and executes the flushing processing. In a case that the flushing processing is executed, the ink inside the nozzles 33 is discharged and the meniscus is formed without the inks of the respective colors are not mixed with the inks of other color inside the nozzles 33. The controller 130 drives the carriage driving motor 103 (step S24) so as to return the printing head 34 to the maintenance position.

After the maintenance processing has been performed as described above, in a case that a time previously set has elapsed while the power source of the printer 10 is kept in ON-state, the maintenance processing is performed again.

After driving the carriage driving motor 103 in the step S24, the controller 130 determines as to whether or not an input of turning the power source off is inputted from the operating part 21 (step S25). In a case that the controller 130 determines that the input of turning the power source off is inputted from the operating part 21 (step S25: YES), the controller 130 ends the counting started in the step S21 (step S26). The controller 130 drives the cap driving motor 104 (step S27) so as to move the cap 71 upward and causes the cap 71 to cover the nozzle surface 33A. The controller 130 turns the power source off (step S28) and ends the series of operations as described above.

In a case that the controller 130 determines in step S25 that the input of turning the power source off is not inputted from the operating part 21 (step S25: NO), the controller 130 determines as to whether or not the time previously set has elapsed since the starting of the counting in the step S21 (step S29). In a case that the controller 130 determines that a predetermined time has elapsed since the starting of the counting in the step S21 (step S29: YES), the controller obtains a count value T (step S30). In a case that the controller 130 determines that the predetermined time has not elapsed since the starting of the counting in the step S21 (step S29: NO), the controller keeps on determining as to whether or not the predetermined time has elapsed.

The controller 130 obtains the values of the size "a" of one molecule of the ink, the diameter d of the ink droplet, the viscosity $\eta$ of the ink, the equilibrium contact angle $\theta_E$, the receding contact angle $\theta_D$ and the surface tension $\gamma$ of the ink which have been previously stored in a table (not depicted in the drawings) based on the count value T (step S31). The kind information in this situation is same as the kind information obtained in the step S11 (that is, ink A). The controller 130 determines a maximum moving velocity Vmax2 based on the obtained values (step S32). The controller 130 determines a moving velocity V2 of the printing head 34 with respect to the wiper 72 based on the maximum moving velocity Vmax2 (step S33). Specifically, the controller 130 determines the moving velocity V2 to be a velocity which is 90% of the maximum moving velocity Vmax2.

The controller 130 drives the cap driving motor 104 (step S34) so as to move the cap 71 upward and to cause the cap 71 to cover the nozzle surface 33A. The controller 130 drives the pump 77 (step S35) and executes the purge processing. After the purge processing, the controller 130 drives the cap driving motor 104 (step S36) so as to move the cap 71 downward and to separate the cap 71 away from the nozzle surface 33A.

The controller 130 drives the wiper driving motor 105 (step S37) so as to move the wiper 72 upward. The controller 130 drives the carriage driving motor 103 (step S38) so as to move the printing head 34, located at the maintenance position, rightward at the moving velocity V2. With this, the wiping processing is performed. After the controller 130 drives the carriage driving motor 103 so as to move the printing head 34 rightward, the controller 130 drives the wiper driving motor 105 (step S39) so as to move the wiper 72 positioned at the upper side downward. The controller 130 drives the carriage driving motor 103 (step S40) so as to move the printing head 34 leftward and up to the maintenance position.

Immediately after the nozzle surface 33A has been wiped by the wiper 72 at the moving velocity V2, the controller 130 starts counting (step S21). The controller 130 repeatedly performs the maintenance processing in the state that the power source is not turned off. For example, the controller 130 drives the carriage driving motor 103 (step S22) so as to move the printing head 34 from the maintenance position so that the printing head 34 is positioned above the flushing foam, and then executes the flushing processing (step S23).

Effects of the Embodiment

According to the above-described configuration, since the moving velocity V of the wiper 72 is determined based on the receding contact angle $\theta_D$ of the ink and the surface tension $\gamma$ of the ink, the moving velocity V for wiping the nozzle surface 33A by the wiper 72 with reduced unwiped ink is set precisely and the leaving of unwiped ink by the wiper 72 is reduced.

According to the above-described configuration, since the moving velocity V of the wiper 72 is determined further based on the equilibrium contact angle $\theta_E$ as well, the moving velocity V for wiping the nozzle surface 33A by the wiper 72 with reduced unwiped ink is set more precisely and the leaving of unwiped ink by the wiper 72 is further reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modification

In the above-described embodiment, the controller 130 starts the counting immediately after the nozzle surface 33A has been wiped by the wiper 72 at the moving velocity V1, and the controller 130 obtains the count value T in the case that the time previously set has elapsed. The obtained count value T, however, is not limited to such a constant value. For example, it is acceptable that the maintenance processing is performed corresponding to a consumption amount of the ink or corresponding to an input by the user. It is acceptable that a count value U which is obtained may be a value which is determined according to the consumption of the ink or a timing of the user input. In this case, it is acceptable that the controller 130 obtains respective values stored in a table 81, based on the count value U. Example of the respective values stored in the table 81 are as indicated in FIG. 9.

After the nozzle surface 33A has been wiped by the wiper 72, water content evaporates, as the time passes, from the ink, in the nozzle 33, forming the meniscus. Thus, even after the nozzle surface 33A has been wiped and that the ink adhered thereto has been wiped off, the ink from which the water content has evaporated adheres to the nozzle surface 33A by the ejection of the ink from the nozzles 33. In view of such a situation, it is possible to perform the wiping processing in a satisfactory manner and in a short period of time, by obtaining the respective values based on the count value T and by wiping the nozzle surface 33A at the determined maximum moving velocity Vmax.

Figure 10:
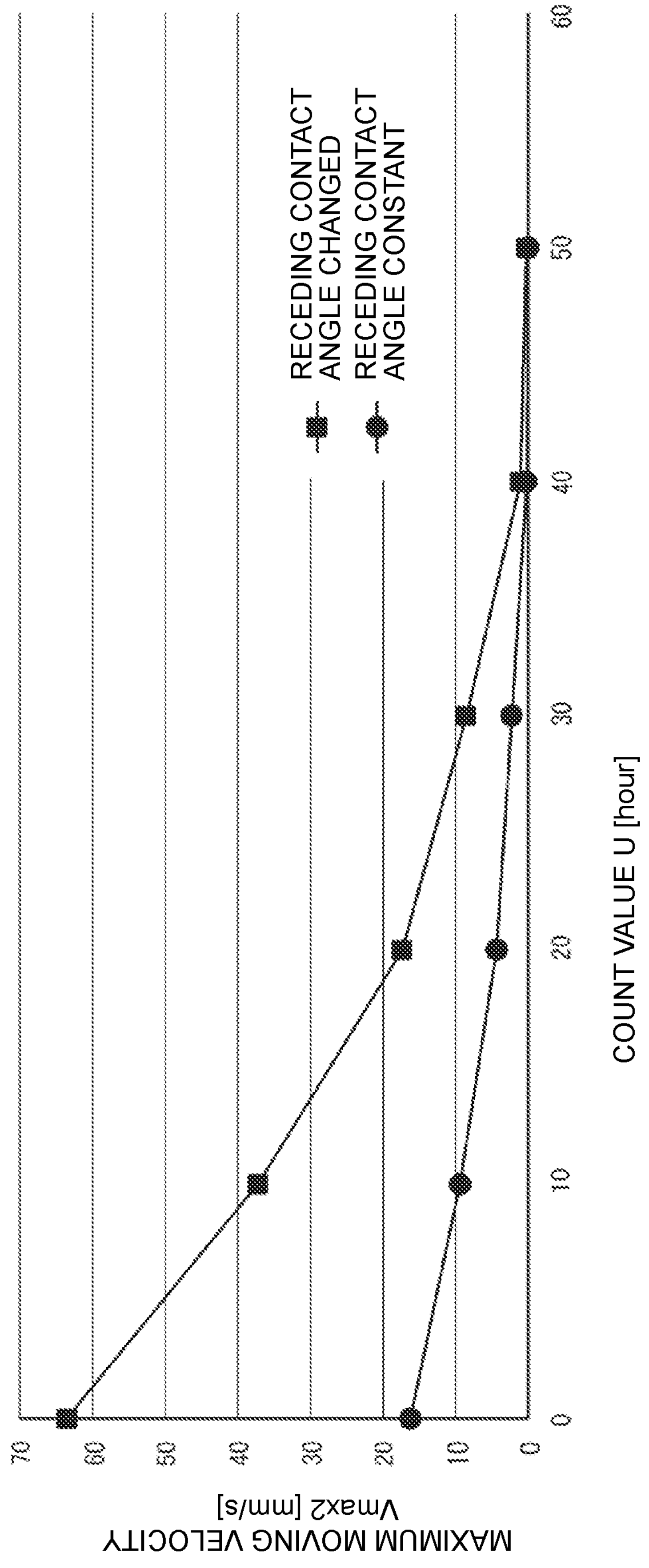
FIG. 10 is a graph indicating a maximum moving velocity Vmax2 based on a count value since the previous driving of the wiper 72.

In the first modification, respective values corresponding to six kinds of the count value U which are 0, 10, 20, 30, 40 and 50 hours are stored in the table 81; the maximum moving velocity Vmax is determined with respect to the count value U, based on the respective values (see FIG. 10).

As depicted in FIG. 9, the table 81 storing the respective values of the size "a" of one molecule of the ink, the diameter d of the ink droplet, the viscosity $\eta$ of the ink, the equilibrium contact angle $\theta_E$, the receding contact angle $\theta_D$ and the surface tension $\gamma$ of the ink corresponding to the count values U is stored in the EEPROM 134 with, for example, the following content. In a case that the count value U is 0 (zero) hours, then the size "a" of one molecule of the ink is $1\times10^{-10}$ [m], the diameter d of the ink droplet is 0.00248 [m], the viscosity $\eta$ of the ink is 4.05 [mPa·s], the equilibrium contact angle $\theta_E$ is 1.29 [rad], the receding contact angle $\theta_D$ is 0.87 [rad] and the surface tension $\gamma$ of the ink is 0.0300 [N/m].

In a case that the count value U is 10 hours, then the size "a" of one molecule of the ink is $1\times10^{-10}$ [m], the diameter d of the ink droplet is 0.00226 [m], the viscosity $\eta$ of the ink is 6.44 [mPa·s], the equilibrium contact angle $\theta_E$ is 1.27 [rad], the receding contact angle $\theta_D$ is 0.79 [rad] and the surface tension $\gamma$ of the ink is 0.0295 [N/m].

In a case that the count value U is 20 hours, then the size "a" of one molecule of the ink is $1\times10^{-10}$ [m], the diameter d of the ink droplet is 0.00217 [m], the viscosity η of the ink is 12.59 [mPa·s], the equilibrium contact angle $\theta_E$ is 1.26 [rad], the receding contact angle $\theta_D$ is 0.70 [rad] and the surface tension γ of the ink is 0.0290 [N/m].

In a case that the count value U is 30 hours, then the size "a" of one molecule of the ink is $1\times10^{-10}$ [m], the diameter d of the ink droplet is 0.00203 [m], the viscosity η of the ink is 22.92 [mPa·s], the equilibrium contact angle $\theta_E$ is 1.24 [rad], the receding contact angle $\theta_D$ is 0.61 [rad] and the surface tension γ of the ink is 0.0285 [N/m].

In a case that the count value U is 40 hours, then the size "a" of one molecule of the ink is $1\times10^{-10}$ [m], the diameter d of the ink droplet is 0.00192 [m], the viscosity η of the ink is 193.49 [mPa·s], the equilibrium contact angle $\theta_E$ is 1.22 [rad], the receding contact angle $\theta_D$ is 0.52 [rad] and the surface tension γ of the ink is 0.0280 [N/m].

In a case that the count value U is 50 hours, then the size "a" of one molecule of the ink is $1\times10^{-10}$ [m], the diameter d of the ink droplet is 0.00183 [m], the viscosity η of the ink is 598.54 [mPa·s], the equilibrium contact angle $\theta_E$ is 1.20 [rad], the receding contact angle $\theta_D$ is 0.44 [rad] and the surface tension γ is 0.0275 [N/m]. As the count value U becomes greater, the water content contained in the ink droplet evaporates and the diameter d of the ink droplet and the surface tension γ of the ink become smaller. Further, if the value of the surface tension γ of the ink becomes smaller, the value of each of the receding contact angle $\theta_D$ and the equilibrium contact angle $\theta_E$ becomes smaller as well. On the other hand, the viscosity η of the ink tends to become greater due to the evaporation of the water content contained in the ink droplet.

FIG. 10 depicts the relationship between the count value U and the maximum moving velocity Vmax2 of the wiper 72. In FIG. 10, a comparison is made between a case that the receding contact angle $\theta_D$ is changed based on the count value U as indicated by square marks and a case that the retreat angle $\theta_D$ is constant as indicated by circular marks. Specifically, in the case that the receding contact angle $\theta_D$ is changed, the value of the receding contact angle $\theta_D$ of FIG. 10 corresponding to the count value U is used for the calculation. Meanwhile, in the case that the receding contact angle $\theta_D$ is constant, the value of the receding contact angle $\theta_D$ used in the calculation is 0.44 (that is, the value corresponding to the count value U of 50) regardless of the value of the count value U. In the case that the receding contact angle $\theta_D$ is changed, the maximum moving velocity Vmax2 is greater than the maximum moving velocity Vmax2 in the case that the receding contact angle is constant. Namely, by considering the change in the receding contact angle $\theta_D$, it is possible to determine, more precisely, the maximum moving velocity Vvax2 with which unwiped ink is reduced. Further, smaller the count value U is, greater the difference between the maximum moving velocity Vmax2 and the conventional moving velocity is. Thus, as the elapsed time becomes shorter, it is possible to fasten the moving velocity V of the wiper 72 compared to the conventional technique, more remarkably. Owing to this, it is possible to perform the wiping processing with reduced unwiped ink in a satisfactory manner, while shortening a waiting time of the user.

According to the above-described configuration, since the receding contact angle $\theta_D$ is determined based on the count value U which varies, it is possible to obtain the respective values of the ink according to the elapsed time. Owing to this, it is possible for the controller 130 to determine, more precisely, the moving velocity V for causing the wiper 72 to wipe the nozzle surface 33A with reduced unwiped ink. Thus, occurrence of ink left unwiped is further reduced.

Other Modifications

In the above-described embodiments and modifications, the explanation has been given about the case wherein values of each of the size "a" of one molecule of the ink, the diameter d of the ink droplet, the viscosity η of the ink, the equilibrium contact angle $\theta_E$, the receding contact angle $\theta_D$ and the surface tension γ of the ink are previously stored in the table 80, the present disclosure is not limited to this. For example, it is acceptable that the printer 10 is further provided with a temperature sensor configured to measure the environmental temperature at the inside of the printer 10, and that the controller 130 is configured to set the maximum moving velocity Vmax based on temperature information obtained from the temperature sensor. In this situation, the maximum moving velocity Vmax is set based on respective values which are previously stored in a table and correspond to the obtained temperature information.

In the above-described embodiment, the explanation has been given about the example in which the printing head 34 moves in the left-right direction 3, in the state that the wiper 72 is moved to the upper side in the up-down direction 1, so that the wiper 72 wipes the nozzle surface 33A. However, the present disclosure is not limited to this. It is acceptable, for example, that the wiper 72 is fixed to a position, in the up-down direction 1, at which the wiper 72 makes contact with the nozzle surface 33A.

In the above-described embodiment, the explanation has been given about the example in which the controller 130 selects, based on the information stored in the IC substrate, the kind information of the ink A stored in the table 80. However, the present disclosure is not limited to this. It is acceptable that the controller 130 obtains kind information of the ink B or kind information of the ink C stored in the IC substrate, and obtains the respective values in the table 80.

In the above-described embodiment, the explanation has been given about the example in which the controller 130 obtains the kind information from the IC substrate mounted on the cartridge 70. However, the present disclosure is not limited to this. It is acceptable that the controller 130 obtains the kind information from the internet or a server, via a terminal connected to the printer 10. Further, in a case that the ink is supplied to the printer 10 from a tank, rather than from the cartridge 70, the kind information may be stored previously (in advance) in the table 80. In a case that different kinds of inks are assumed to be stored in the tank, it is acceptable that the user inputs the kind information via the operating part 21. In the above-described embodiment, the explanation has been given about the example in which the nozzle surface 33A is capped by the cap 71 in a case that the power source of the printer 10 is turned on, and that the count value Tis reset every time the nozzle surface 33A is capped by the cap 71. However, the present disclosure is not limited to this configuration. Further, a timing at which the resetting of the count value T is performed may also be a timing at which the nozzle surface 33A is capped by the cap 71. In a case that the purge processing is not performed even when the capping of the nozzle surface 33A is performed, it is acceptable that the resetting of the count value T is not performed.

In the above-described embodiment, the explanation has been given, about the example in which the count value U is the six kinds of elapsed time. However, the present disclosure is not limited to this. The number of the count value U is not more than five kinds, or may be not less than seven kinds. Further, the count value U may be continuous values.

In the above-described embodiment, the explanation has been given, about the example in which the moving velocity V of the wiper 72 relative to the nozzle surface 33A is made 90% of the maximum moving velocity Vmax. However, the present disclosure is not limited to this. The moving velocity V of the wiper 72 relative to the nozzle surface 33A may be the maximum moving velocity Vmax all the time. Further, in a case that the controller 130 is configured to drive the carriage driving motor 103 in a state that the moving velocity V of the wiper 72 with respect to the nozzle surface 33A is not set, the moving velocity V becomes slow, depending on the size or the weight of the printing head 34. Even in such a case, by making the moving velocity V the maximum moving velocity Vmax, it is possible to perform the wiping processing in a short period of time.

In the above described embodiment, the maximum moving velocity Vmax is determined based on respective values stored in the table 80 or the table 81. However, the present disclosure is not limited to this. The controller 130 may be configured to move the wiper 72 relative to the printing head 34 based on a moving velocity determined based on the receding contact angle $\theta_D$ and the viscosity n. For example, the table 80 and/or the table 81 may store the maximum moving velocity Vmax and/or the moving velocity V calculated in advance. In this case, the controller 130 may determine the moving velocity V based on the maximum moving velocity Vmax and/or the moving velocity V read out from the table 80 and/or table 81.

In the present disclosure, the moving velocity of the wiper means the velocity of the relative movement between the wiper and the head. The relative movement between the wiper and the head includes an aspect in which the wiper is moved and the head is stopped, an aspect in which the wiper is stopped and the head is moved, and an aspect in which both of the wiper and the head are moved.

What is claimed is:

1. A liquid ejecting apparatus comprising:

a head having a nozzle surface in which a nozzle is opened;

a wiper configured to move relative to the head in a state that the wiper is in contact with the nozzle surface; and a controller, wherein the controller is configured to move the wiper relative to the head based on a moving velocity determined based on parameters including first parameter according to a receding contact angle of a liquid to be discharged from the nozzle and second parameter according to a viscosity of the liquid.

2. The liquid ejecting apparatus according to claim 1, further comprising a memory, wherein:

the memory stores the first parameter and the second parameter; and the controller is configured to determine the moving velocity based on the parameters including the first parameter and the second parameter.

3. The liquid ejecting apparatus according to claim 1, wherein the first parameter is indicated by $\gamma \tan \theta_D$, provided that "$\gamma$" is a surface tension of the liquid and "$\theta_D$" is the receding contact angle of the liquid.

4. The liquid ejecting apparatus according to claim 1, wherein the controller is configured to move the wiper relative to the head based on the moving velocity determined based on the parameters including third parameter according to an equilibrium contact angle of the liquid, the first parameter, and the second parameter.

5. The liquid ejecting apparatus according to claim 4, further comprising a memory, wherein:

the memory stores the first parameter, the second parameter and the third parameter; and the controller is configured to determine the moving velocity based on the parameters including the first parameter, the second parameter and the third parameter.

6. The liquid ejecting apparatus according to claim 4, wherein the third parameter is indicated by ($\cos \theta_D - \cos \theta_E$), provided that "$\theta_D$" is the receding contact angle of the liquid and "$\theta_E$" is the equilibrium contact angle of the liquid.

7. The liquid ejecting apparatus according to claim 2, wherein:

the memory stores a table in which the receding contact angle of the liquid corresponding to a kind of the liquid is set as the first parameter; and the controller is configured to obtain kind information indicating the kind of the liquid and to determine the receding contact angle of the liquid according to the obtained kind information and based on the table.

8. The liquid ejecting apparatus according to claim 7, wherein:

in the table, the receding contact angle of the liquid corresponding to an elapsed time elapsed since the wiper has been moved relative to the head is set; and the controller is configured to obtain the elapsed time elapsed since the wiper has been moved relative to the head and to determine the receding contact angle of the liquid in the first parameter, according to the obtained elapsed time.

9. The liquid ejecting apparatus according to claim 1, further comprising a memory, wherein:

the memory stores a table in which the moving velocity corresponding to a kind of the liquid is set; and the controller is configured to obtain kind information indicating the kind of the liquid and to determine the moving velocity according to the obtained kind information and based on the table.

10. The liquid ejecting apparatus according to claim 9, wherein the moving velocity corresponding to an elapsed time elapsed since the wiper has been moved relative to the head is set in the table; and the controller is configured to obtain the elapsed time elapsed since the wiper has been moved relative to the head and to determine the moving velocity according to the obtained elapsed time and based on the table.

11. The liquid ejecting apparatus according to claim 1, wherein a maximum value of the moving velocity satisfies following expressions:

$$V\max = \gamma \tan\theta_D(\cos\theta_D - \cos\theta_E)/3\eta L$$

$$L = \ln(d/a)$$

provided that, "Vmax" is the maximum value of the moving velocity of the wiper, "$\gamma$" is a surface tension of the liquid, "$\theta_D$" is the receding contact angle of the liquid, "$\theta_E$" is an equilibrium contact angle of the liquid, "$\eta$" is the viscosity of the liquid; "d" is a diameter of a droplet of the liquid, and "a" is a size of one molecule of the liquid.

12. A liquid ejecting apparatus comprising:

a head having a nozzle surface in which a nozzle is opened;

a wiper configured to move relative to the head in a state that the wiper is in contact with the nozzle surface; and a controller, wherein the controller is configured to move the wiper relative to the head based on a moving velocity determined based on parameters including first parameter according to a receding contact angle of a liquid to be discharged from the nozzle and second parameter according to a viscosity of the liquid; and a maximum value of the moving velocity satisfies the following expressions:

$$V\max = \gamma\tan\theta_D(\cos\theta_D - \cos\theta_E)/3\eta L$$

$$L = \ln(d/a)$$

provided that, "Vmax" is the maximum value of the moving velocity of the wiper, "$\gamma$" is a surface tension of the liquid, "$\theta_D$" is the receding contact angle of the liquid, "$\theta_E$" is an equilibrium contact angle of the liquid, "$\eta$" is the viscosity of the liquid, "d" is a diameter of a droplet of the liquid, and "a" is a size of one molecule of the liquid.

13. The liquid ejecting apparatus according to claim 12, further comprising a memory, wherein:

the memory stores the first parameter and the second parameter; and the controller is configured to determine the moving velocity based on the parameters including the first parameter and the second parameter.

14. A control method for a liquid ejecting apparatus, the liquid ejecting apparatus including:

a head having a nozzle surface in which a nozzle is opened;

a wiper configured to move relative to the head in a state that the wiper is in contact with the nozzle surface; and a controller, the method comprising moving the wiper relative to the head, by the controller, based on a moving velocity determined based on parameters including first parameter according to a receding contact angle of a liquid to be discharged from the nozzle and second parameter according to a viscosity of the liquid.

* * * * *